United States Patent [19]
Alcock

[11] 3,976,456
[45] Aug. 24, 1976

[54] GAS SCRUBBER
[75] Inventor: Keith Alcock, Columbus, Ohio
[73] Assignee: Dresser Industries, Inc., Dallas, Tex.
[22] Filed: Apr. 7, 1975
[21] Appl. No.: 565,927

[52] U.S. Cl............................ 55/238; 55/222; 55/256; 55/257 C; 55/DIG. 30; 261/79 A; 261/161; 261/DIG. 54; 60/310
[51] Int. Cl.² ............................ B01D 47/10
[58] Field of Search............ 55/222, 226, 235–239, 55/244, 248, 249, 256, 257, DIG. 30; 261/28, 79 A, DIG. 54, 161; 60/310

[56] References Cited
UNITED STATES PATENTS

| | | | |
|---|---|---|---|
| 1,428,950 | 9/1922 | Edens | 55/249 |
| 1,791,814 | 2/1931 | Hillery | 55/257 X |
| 2,171,574 | 9/1939 | Lambert et al. | 55/257 X |
| 2,524,703 | 10/1950 | Hartman | 55/257 |
| 2,832,432 | 4/1958 | Fanton | 55/249 |
| 3,224,170 | 12/1965 | Iwanaga et al. | 55/257 |
| 3,372,540 | 3/1968 | Birdwell | 60/310 |
| 3,456,928 | 7/1969 | Selway | 55/257 |
| 3,464,189 | 9/1969 | Mergenthaler | 261/DIG. 54 |
| 3,495,385 | 2/1970 | Glass | 55/237 |
| 3,751,883 | 8/1973 | Mergenthaler | 55/256 X |

FOREIGN PATENTS OR APPLICATIONS

| | | | |
|---|---|---|---|
| 1,010,415 | 11/1965 | United Kingdom | 261/DIG. 54 |

Primary Examiner—Frank W. Lutter
Assistant Examiner—David L. Lacey
Attorney, Agent, or Firm—John M. Lorenzen

[57] ABSTRACT

An improved gas scrubber is provided which is particularly suited for cleaning and cooling the exhaust gases from a diesel powered mine vehicle. The invention is embodied in apparatus including an enclosure which is partially filled with a liquid such as water. An inlet for the exhaust gases is located above the liquid level, as is also an outlet for the cleaned gases to escape. A tube connected to the inlet extends downwardly to below the water level, then changes direction and extends upwardly with constantly increasing cross section and with at least some portion of it in curvature to an open end interiorly of the enclosure and above the liquid level. One or more orifices in the submerged portion of the tube admit water droplets which are sucked into and turbulently mixed with the high velocity gases in proportion to the amount of combustion exhaust from the engine. The water droplets and particulate matter are separated from the gas stream by the combination of centrifugal force and their own gravity when the gas stream is slowed down.

11 Claims, 7 Drawing Figures

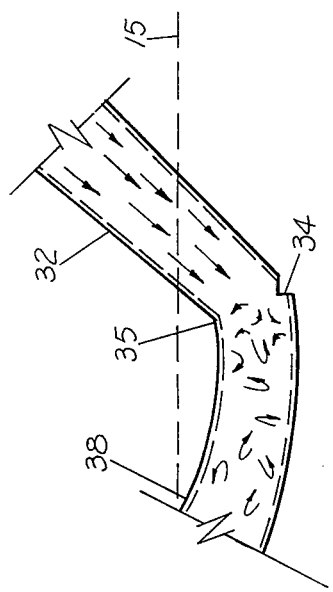
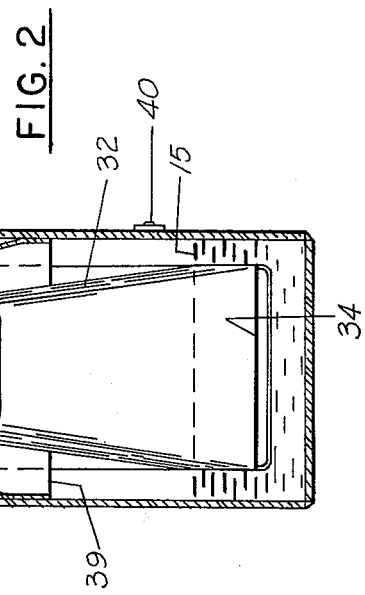
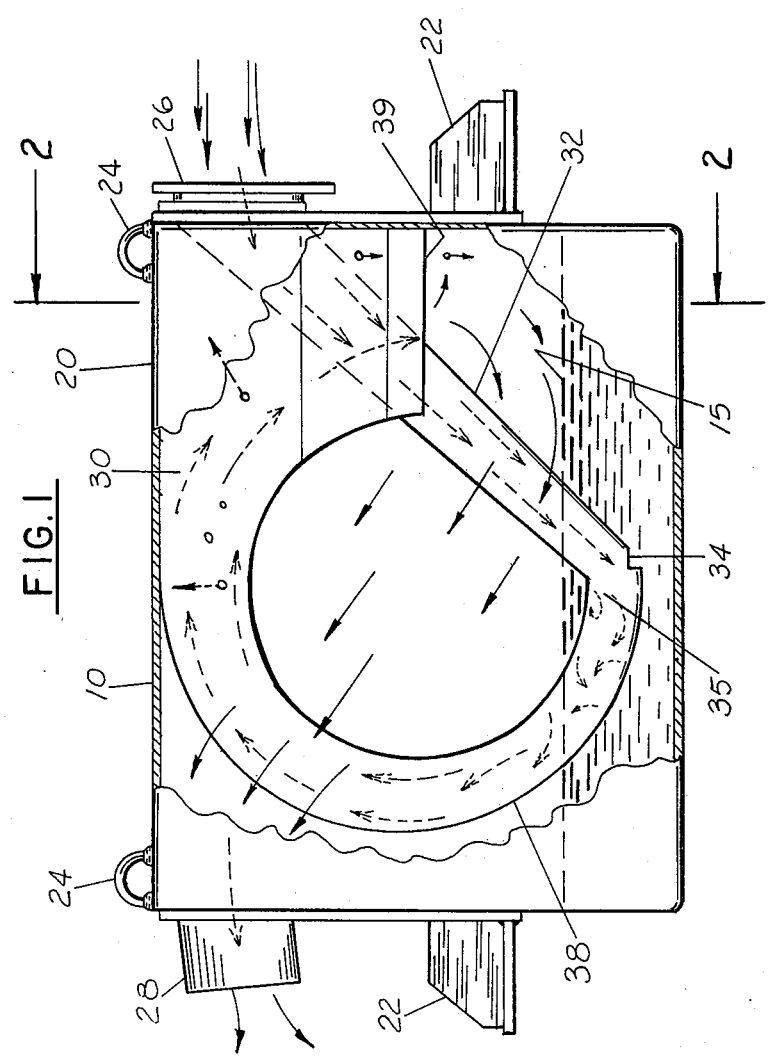

GAS SCRUBBER

BACKGROUND AND DESCRIPTION OF THE PRIOR ART

Internal combustion engines exhaust various pollutants. Diesel engines in particular produce sulfurous gases, aldehydes, nitrogen oxides, unburned hydrocarbons and other particulate matter. Aside from the general ecological interests in reducing such pollution, the necessity of doing so in underground mine environments is critical to the safety of the mine personnel. Further, in underground coal mines the high temperatures of exhaust gases present additional hazards. For instance, either the hot gases themselves or hot machine parts such as the manifold could ignite any combustible material present, such as coal dust. There is also the danger of miners working in the very confined area being burned by the hot gases.

Accordingly, various attempts have been made heretofore to provide a scrubber which would effectively clean and cool diesel exhaust in mine applications. Some of these devices are shown in British Pat. Nos. 1,010,415; 903,493; 706,129; 664,317; and 466,321.

In general, the prior art devices use water to remove the pollutants from the gas stream by one of two methods. In one approach, water is sprayed into the gas stream to scrub out the particulate. With water spray systems it is usually necessary to flow the gases along a tortuous path to effect adequate scrubbing and separation of the water out again. In the other popular approach, the exhaust gases are bubbled through a water bath. Both these methods substantially increase the back pressure on the engine and therefor actually reduce its effective horsepower.

British Pat. No. 1,010,415 shows a third approach in which the gases are flowed through a venturi tube and water droplets sucked into the gas flow from a water chamber below the venturi. A particular problem with this approach is that the effectiveness of the device is very sensitive to the level of the water.

In many of these prior art devices, the mixing action is inadequate to effect satisfactory cleaning of the gases. In addition, many of these devices emit gases which still include water droplets. Not only does this create problems with wet equipment and environment, the resultant steam haze restricts the mine operator's visibility. Furthermore, in underground mining applications the higher consumption of water of those devices requires additional storage capacity on the equipment.

To satisfy an additional concern in underground coal mining, where highly combustible methane gas and coal dust are present, a suitable scrubber should effectively arrest any exposed flame accompanying the engine exhaust.

Objects

It is therefore the object of the present invention to provide an improved gas scrubber which will more effectively remove pollutant gases and particulate from exhaust gases, which will more effectively cool such gases, and which will arrest any flame accompanying such gases, all with a minimum increase in back pressure on the engine and with a minimum consumption of water.

It is a further object to provide an exhaust gas scrubber with the features described above and which is particularly suited for use with a diesel engine on underground mining equipment.

SUMMARY OF THE INVENTION

These and other objects are achieved by the gas scrubber of the present invention in which water droplets are sucked into the exhaust gases in proportion to their velocity, are mixed with gases by induced turbulent flow, and are completely separated again along with particulate material by the combination of centrifugal force and their own gravity. The invention is embodied in apparatus which includes an enclosure partially filled with water or other suitable liquid. An inlet to the enclosure for connection to the source of exhaust gases is provided above the water level. An outlet, also above the water level, is also provided. A tube extends from the inlet at a downward angle to below the water level and arcuately upward with increasing cross section to an open end interiorly of the enclosure above the water level. One or more orifices is provided in the submerged portion of said tube through which water droplets are sucked into and turbulently mixed with the flowing gases.

In the operation of this device, the hot, dirty exhaust gases enter through the inlet and are directed downwardly through the tube. In the submerged portion, water is drawn into the fast flowing gases. At this same point, the tube has a sharp angular change in direction which either creates or increases the turbulent flow and mixing of the water droplets and gases. The gases and water droplets flow upwardly through the expansion cone, at least a portion of which is curved, where the gases are slowed considerably until the heavier water droplets and particulate matter separate from the gas stream. Separation is enhanced by the centrifugal action in the curved portion of the tube. The gases leave through the open end of the tube into the interior of the enclosure and then by the path of least resistance out through the outlet. The scrubber is so designed that the water droplets and particulate will fall back into the bath at the bottom of the enclosure.

Among the many advantages offered by the gas scrubber of the present invention are: improved cleaning and cooling efficiency, minimal consumption of liquid, minimal back pressure on the engine, better flame arrest, no blow-out of liquid on start-up, and reduced sensitivity to the level of liquid in the enclosure or to the grade of the vehicle.

Having thus briefly described the invention, these and other features will be fully discussed with reference to the accompanying drawings which form part of this specification and of which:

FIG. 1 is a side elevation of a gas scrubber embodying my invention in which a portion of the outer enclosure is broken away to more clearly illustrate the arrangement of parts;

FIG. 2 is an end elevation of the scrubber of FIG. 1 as taken along the section line 2—2 in FIG. 1;

FIG. 3 is an enlarged view of a portion of the scrubber shown in FIG. 1; and

DETAILED DESCRIPTION OF DRAWINGS

Figure 4:
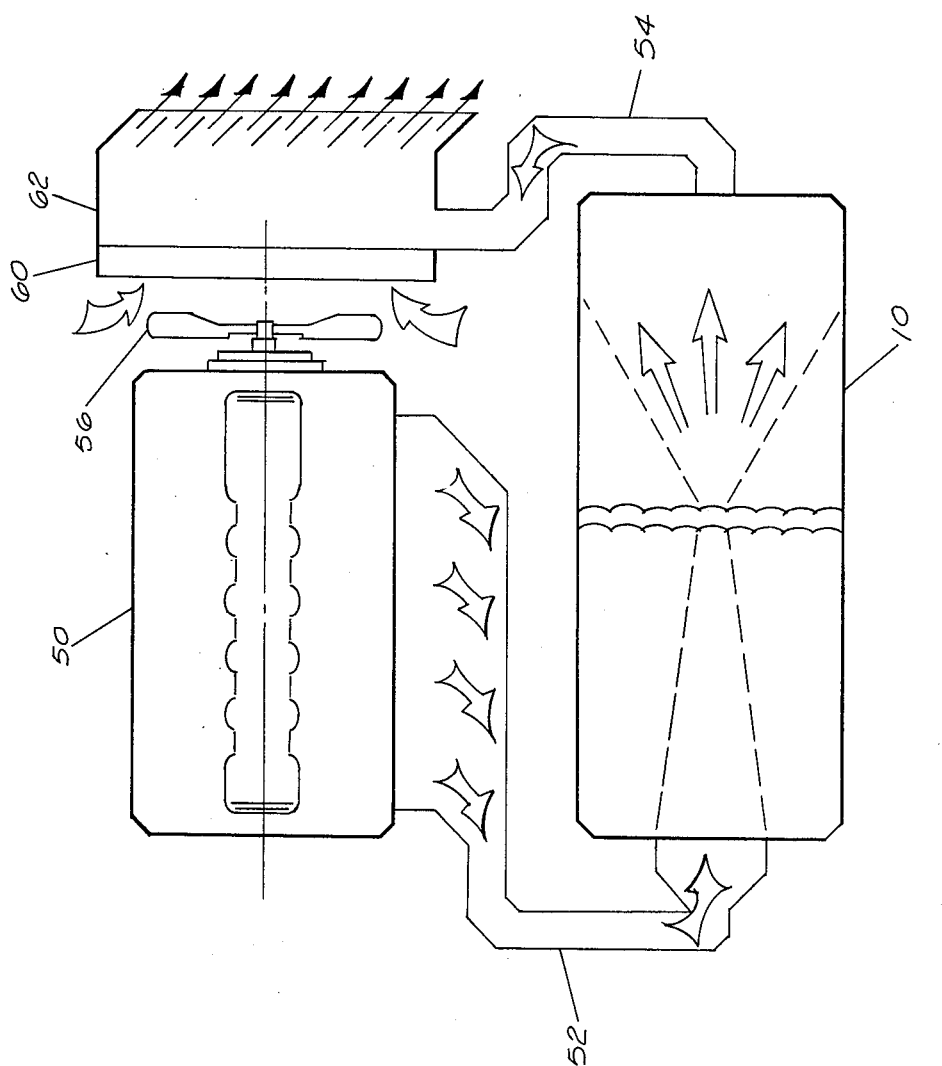
FIG. 4 is a schematic layout showing an exhaust scrubber such as embodies the present invention in combination with an engine, radiator and dilution chamber.

The gas scrubber is indicated generally at 10 and consists generally of the enclosure 20 and the tube 30.

The enclosure is adapted to be partially filled with a liquid to a level 15 above the lower part of the tube 30. A fitting 40 is provided for maintaining the liquid level in accordance with any suitable level control system. Although other liquids might be used, in the following discussion the liquid will be presumed to be water.

Brackets 22 are provided for mounting the scrubber in a mine vehicle or wherever desired, while the hook eyes 24 are provided to facilitate handling.

The flanged inlet 26 is integral with the enclosure 20 and is adapted for connection to a source of gases to be treated, such as an engine manifold, by any suitable means. The outlet 28 is provided for the escape of gases from the enclosure and can also be connected to another conduit or apparatus if desired. The inlet 26 and outlet 28 are located well above the water level 15 and, although shown in the side walls of the enclosure, could alternatively be located in the top of the enclosure 20.

The tube 30 has an inlet section 32 which is connected to the inlet 26 and extends at a downward angle to below the water level 15. The inlet section 32 is preferably of constant cross sectional area although as shown the cross sectional shape changes from generally square at the inlet to generally rectangular in the submerged portion. Because of the sharp downward angle of section 32 there is little or no risk of water being sucked back into the engine in the case of a backfire.

Below the water level 15 the tube changes direction and shape sharply in the transition section 35 into the expansion section 38. The expansion section as shown comprises an arcuately shaped cone of constantly increasing cross section area which terminates at opening 39 within the interior of the enclosure. Although the expansion zone can be of a variety of shapes, at least a portion of it should be arcuate such that centrifugal forces are exerted on water droplets and particulate passing therethrough.

At the opening 39 the tube expands out to the width of the enclosure 20 and in the embodiment shown straddles a part of the inlet section 32. This arrangement has unique advantages discussed later.

Referring to FIG. 3, the transition section 35 is shown enlarged. Note the sharp change in angle between the inlet section 32 and the expansion section 38. This angular change either converts the generally laminar flow of the incoming gases into turbulent flow, or enhances the already turbulent flow, as the gases enter the first part of the expansion section 38. This turbulent flow effects better mixing of the water droplets and exhaust gases.

To further accelerate the gases in the transition section and thus enhance the venturi effect, the cross section of the tube 30 can be restricted adjacent to the location of the water orifice 34. Although not contrastingly noticeable the tube 30 is at its minimum cross section at the point where it changes direction in FIG. 3.

The orifice 34 is provided on the lower side of the tube 30 right at the angular change in direction. As shown, the opening 34 is a long narrow slot. However, it is understood that a series of small holes or a slot of other configuration could be used. It is only necessary that the opening 34 be sized to admit water into the flowing gas stream in a desired ratio and at a desired angle to further enhance the turbulence in the transition 35. The opening 34 should also be well below the water level 15.

In the operation of the scrubber 10, hot and dirty gases enter through the inlet 26. The gases flow at a generally constant velocity downward through section 32 of tube 30. At the transition zone 35 the gases are suddenly accelerated and thrown into turbulent flow as indicated in FIG. 3. As the gases are accelerated they draw water into the tube in droplets which mix thoroughly with the gases in the turbulent area.

The gases continue along the expansion section 38 until due to the tubes increasing cross section they decelerate. The water droplets and particulate material are partially separated from the slowing gas stream by the centrifugal force due to the arcuate shape of the tube. As the gases slow down still further, the heavier water droplets and particulate fall under their own gravity back into the water reservoir 15.

The cleaned and cooled gases escape out the open end 39 of the tube into the interior of the enclosure and flow easily out through the outlet 28.

As mentioned earlier, the particular configuration of the tube 30 adjacent its open end 39 offers an additional advantage. The temperature of the exhaust gases entering the scrubbers is quite high and accordingly the inlet section 32 of the tube becomes very hot. However, the cooled gases and water droplets impinge upon and pass around the inlet section 32 as they flow from the tube 30 and cool the section 32 to an acceptable temperature.

For similar reasons, it is preferable to locate the tube 30 centrally within the enclosure, as shown in FIG. 2, to prevent the enclosure becoming hotter than necessary. It has also been found preferable to locate the transition 35 and water opening 34 centrally of the water reservoir to insure submersion of those elements even under conditions where the scrubber may be tilted.

Prior to start-up of the scrubber, the submerged part of the tube 30 will be filled with water. However, upon start-up this will be blown out the open end 39 to fall back into the reservoir 15. Thus, unlike many of the wet scrubbers known heretofore, there is no blowing of water out the inlet 28 upon start-up.

The scrubber just described offers many advantages over those known heretofore. It uses less water, a very important consideration in underground mine applications, since a maximum of the entrained water is recovered. It creates a minimum of back pressure since the gases are neither forced through a water bath or through a tortuous path.

The unit is highly efficient since the water induced through the opening 34 and the turbulent mixing is in proportion to the emissions of the engine and thus in turn to the engine load. Furthermore, since the opening 34 and in fact the entire transition section 35 are submerged, the device is less sensitive to the water level than prior art devices which use induced water droplets.

Finally, the scrubber 10 is a more effective flame arrestor since the increased gas flow which would accompany any explosion of flame would automatically induce more flame arresting water into the stream.

Referring now to FIG. 4, an arrangement of a gas scrubber 10 in combination with an engine 50, radiator 60 and dilution chamber 62 is shown schematically. The fan 56 pushes fresh air through the radiator to cool recirculating coolant flowing through the engine through connections not shown.

The hot exhaust gases from the engine 50 flow through conduit 52 into the scrubber 10 which is of the type previously described. The cleaned and cooled gases flow from the scrubber through connection 54 to the dilution chamber 62 located in front of the radiator 60. The cleaned exhaust gases are then further diluted and cooled with the fresh air blown through the radiator by the fan 56.

Having thus briefly described the invention with references to a particular embodiment, it is apparent that other embodiments and modifications will occur to those skilled in the art within the scope of the invention as defined by the following claims.

I claim:

1. A gas scrubber for cleaning and cooling exhaust gases from an engine, comprising:

an enclosure partially filled with a liquid and having an inlet above the liquid adapted to receive the hot exhaust gases from the engine, and an outlet also above the liquid; and a tube situated in the enclosure and connected at one end to the inlet and having its other end opening into the interior of the enclosure above the pool of liquid, comprising: an inlet section extending from the inlet downward to a transition section; said transition section being at least partially submerged in the liquid and having an orifice through the tube wall in the submerged portion through which droplets of the liquid are induced into the flow of exhaust gases through the tube; and an expansion section extending from the submerged transition section upwardly and terminating at the open end of the tube, the expansion section being of constantly expanding cross-sectional area in the direction toward the open end and at least a portion of the expansion section is arcuate such that the wetted gases are decelerated sufficiently and the liquid droplets and particulate matter separate from the gases, the open end of the tube beng disposed in the interior of the enclosure such that the liquid droplets and the particulate matter fall directly into the body of liquid while the cleaned and cooled gases can flow freely in a path from the outlet of the tube to the enclosure outlet without further deflection or acceleration by structural means in said flow path.

2. A gas scrubber as recited in claim 1 wherein the transition section of the tube includes a sharp change in direction in the tube adjacent the orifice effective to increase the turbulence of the gas flow and thereby promote better mixing between the induced liquid droplets and the exhaust gases.

3. A gas scrubber as recited in claim 2, wherein the orifice for admitting the liquid droplets is at the point of angular change in the tube.

4. A gas scrubber as recited in claim 1, wherein the tube is of minimum cross section adjacent the orifice effective to accelerate the gas flow past the orifice and increase the induction of liquid droplets into the gas stream.

5. A gas scrubber as recited in claim 1, wherein said orifice comprises a long narrow slot located on the lowermost portion of the submerged part of the tube.

6. A gas scrubber as recited in claim 1, wherein the open end of the tube extends around a portion of the inlet section such that the cooled gases pass around and cool the inlet section.

7. A gas scrubber as recited in claim 1, wherein the inlet section of said tube is generally constant in cross-sectional area throughout its length.

8. A gas scrubber as recited in claim 1, wherein said tube is a continuous integral member.

9. A gas scrubber as recited in claim 1, wherein the entire expansion section of said tube is arcuately shaped.

10. A gas scrubber as recited in claim 1, wherein the enclosure includes a wall having said inlet and further wherein the open end of said tube is situated adjacent said wall such that the cleaned and cooled gases have a cooling effect to reduce the temperature of said enclosure wall.

11. A gas scrubber as recited in claim 1, wherein the open end of the tube faces toward the body of liquid in the enclosure.

* * * * *